United States Patent
Dull et al.

[11] Patent Number: 6,099,793
[45] Date of Patent: Aug. 8, 2000

[54] METHOD FOR FIRING CERAMIC HONEYCOMB BODIES

[75] Inventors: Alan T. Dull, Elmira; Tudor C. Gheorghiu, Painted Post, both of N.Y.; Thomas S. Hinkle, Wellsboro, Pa.; David L. Oliver, Campbell, N.Y.; Mark A. Spetseris, Pine City, N.Y.; Christopher S. Witte, Beaver Dams, N.Y.

[73] Assignee: Corning Incorporated, Corning, N.Y.

[21] Appl. No.: 09/199,027

[22] Filed: Nov. 24, 1998

Related U.S. Application Data

[60] Provisional application No. 60/067,154, Dec. 2, 1997.

[51] Int. Cl.[7] .................................................. C04B 35/64
[52] U.S. Cl. ........................ 264/631; 264/630; 264/669; 264/670; 264/676
[58] Field of Search .................................... 264/630, 631, 264/669, 670, 676

[56] References Cited

U.S. PATENT DOCUMENTS

| | | |
|---|---|---|
| 3,744,965 | 7/1973 | Remmey et al. . |
| 4,005,981 | 2/1977 | Turnbull . |
| 4,051,231 | 9/1977 | Bond et al. . |
| 4,128,394 | 12/1978 | Naito et al. . |
| 4,235,830 | 11/1980 | Bennett et al. . |
| 4,291,471 | 9/1981 | Bloom . |
| 4,340,555 | 7/1982 | Procter . |
| 4,404,166 | 9/1983 | Wiech, Jr. . |
| 4,474,731 | 10/1984 | Brownlow et al. . |
| 4,795,598 | 1/1989 | Billiet . |
| 4,884,969 | 12/1989 | Kolln et al. . |
| 4,927,577 | 5/1990 | Ohtaka et al. . |
| 4,990,086 | 2/1991 | Eustacchio . |
| 4,994,436 | 2/1991 | Giacobbe . |
| 5,044,944 | 9/1991 | Furuya et al. . |
| 5,078,929 | 1/1992 | Matsumae et al. .................... 264/40.1 |
| 5,183,609 | 2/1993 | Miyahara . |
| 5,248,255 | 9/1993 | Morioka et al. . |
| 5,252,272 | 10/1993 | Yavuz et al. ............................ 264/630 |
| 5,266,027 | 11/1993 | Kuwayama . |
| 5,409,870 | 4/1995 | Locker ................................... 264/631 |
| 5,419,857 | 5/1995 | Van den Sype . |
| 5,725,829 | 3/1998 | Miyahara ............................... 264/630 |
| 6,027,684 | 2/2000 | Gheorghia et al. ..................... 264/631 |

FOREIGN PATENT DOCUMENTS

| | | |
|---|---|---|
| 10-274484 | 10/1998 | Japan . |
| 10-274486 | 10/1998 | Japan . |

OTHER PUBLICATIONS

"Retrofitting Tunnel Kilns", The American Ceramic Society Bulletin, J.J. Lukacs, pp. 48–52.
"Pulse/Proportional Jet Firing at Work", Ceramic Industry, Carboy et al.
"Jet Firing with Pulse/Proportional Control", American Ceramic Society Bulletin, vol. 73, No. 3, Mar. 1994, p. 93–96.

*Primary Examiner*—James Derrington
*Attorney, Agent, or Firm*—Timothy M. Schaeberle

[57] ABSTRACT

A method of firing a green cordierite-ceramic honeycomb structural body containing a carbonaceous material, for example, an organic binder, comprising a two phase process. The first phase comprises firing the green honeycomb structural body in a firing atmosphere to a temperature and for a time sufficient to initiate and sufficiently achieve release of the carbonaceous material while introducing into the firing atmosphere a fluorine-free low-oxygen gas comprising less than about 20% $O_2$, by volume. Once the carbonaceous material is sufficiently released, the second phase involves conventionally firing the green body for a time and a temperature sufficient to initiate and sufficiently achieve the conversion of the green ceramic honeycomb structural body into a fired honeycomb body.

24 Claims, 5 Drawing Sheets

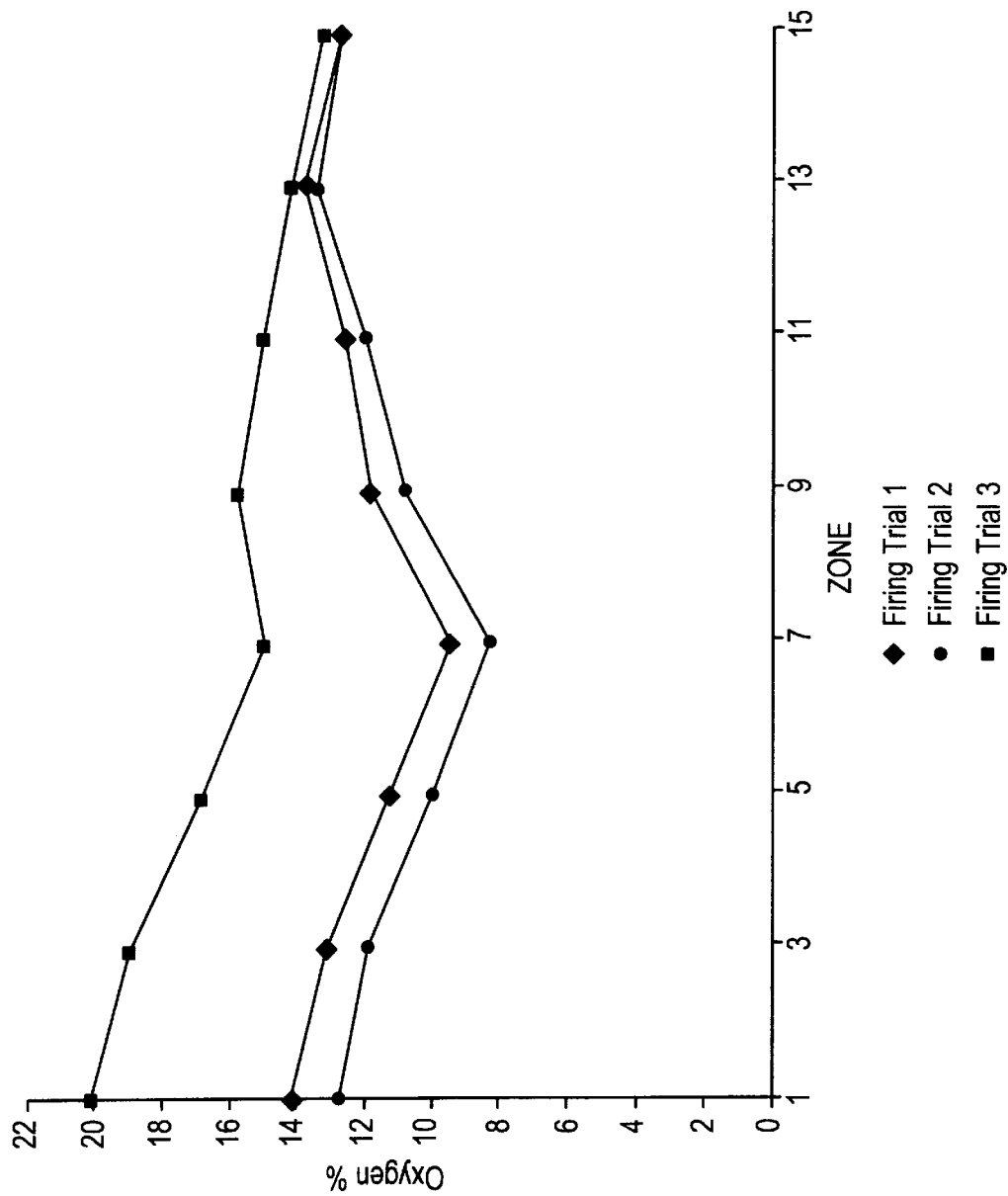

METHOD FOR FIRING CERAMIC HONEYCOMB BODIES

This application claims the benefit of U.S. Provisional Application No. 60/067,154, filed Dec. 2, 1997, entitled "METHOD FOR FIRING CERAMIC HONEYCOMB BODIES", by Dull et al.

The present invention relates to a method of firing cellular ceramic bodies, and more particularly, it relates to a method of firing the cellular ceramic bodies exhibiting problematic high-organic containing batches.

BACKGROUND OF THE INVENTION

Ceramic products of a honeycomb shape, or ceramic honeycomb structures, i.e., cellular ceramic bodies, have been made by preparing a ceramic green body through mixing of ceramic materials with water and various carbonaceous materials, including extrusion and forming aids to form a plasticized batch, forming the body into a honeycomb-shaped ceramic green body through extrusion of the plasticized batch, and finally firing the honeycomb-shaped ceramic green body in a firing furnace at a predetermined temperature.

Extrusion and forming aids used in the above firing of the honeycomb structure include, specifically, organic binders and plasticizers and lubricants, such as methylcelloluse, carboxymethlcellulose, polyvinyl alcohol, alkali stearates and the like. Furthermore, other carbonaceous materials such as graphite have been included in the batch as a pore-forming agent.

It is known that the carbonaceous material release or the decomposition of the carbonaceous material, is an oxidation or exothermic reaction which releases large amounts of heat. Initially the exothermic reaction occurs at the skin or outer portion of the part, resulting in an initial thermal differential whereby the outer portion of the ceramic body is hotter than the core. Subsequently, the skin or outer portion exothermic reaction dies down, and the exothermic reaction region moves into the interior of the ware. Because typical substrates are comprised of ceramic materials, for example cordierite, which are good insulators, and exhibit a cellular structure comprising numerous channels, difficulties are encountered in effectively removing, either by conduction or convection, the heat from the ceramic body. Additionally, due to the cellular structure there is considerable surface area to promote binder reaction with the $O_2$ in the firing atmosphere, thus exacerbating this interior exothermic effect. As such, during the carbonaceous material release, the ceramic body exhibits either a positive or negative thermal differential; i.e., the core of the ceramic body exhibiting either a higher or lower temperature than that of the ceramic at/near the surface. This exothermic reaction, which occurs in the 100 to 600° C. temperature range for carbonaceous materials such as an organic binder or the like, or in the 500–1000° C. temperature range if the body contains, for example, graphite, causes a significant temperature differential between the inside and outside of the part. This temperature differential in the part creates stresses in the ceramic body which may result in cracking of the part. This phenomenon is particularly true for large cellular ceramic parts or parts containing large amounts of organic materials.

Techniques for controlling and inhibiting the thermal differential and resultant crack development are well known. One technique involves reducing burner flame temperature by using excess air for burner combustion, resulting in a reduced flame to product temperature gradient and corresponding slower ware heating rates. However, the high excess air yields an undesirably high percentage oxygen-containing atmosphere that reacts with the organics thereby accelerating release and increasing the internal exothermic reaction. As such, minimization of the thermal differential which develops during organic release, must be accomplished through very slow firing schedules or, alternatively, firing schedules which are carefully matched to the particular ware in the kiln.

Use of atmosphere control in periodic-type kilns to affect carbonaceous material release is generally known. See, for example, U.S. Pat. Nos. 4,404,166 (Wiech, Jr.), 4,474,731 (Brownlow et al.), 4,661,315 (Wiech Jr. et al.) and 4,927,577 (Ohtaka et al.). Although these methods have been shown to be effective enough for use in periodic-type kilns, they are not generally considered to effective in tunnel kilns due to the considerable influx of ambient air (20.9% oxygen) into the firing atmosphere.

The use of pulse firing technology as a substitute for proportional firing has also been disclosed as a method for controlling and inhibiting thermal gradients in periodic kilns. Pulse firing involves the use of either high fire or low fire burner output conditions only, and produces low heating rates without the use of considerable amounts of excess air (oxygen); see, for example Eur. Pat. Appl. No. 0 709 638 which discloses a method of firing ceramic formed bodies using a furnace having burners which alternate from a high to a low output firing state. Although the use of this firing technology has been somewhat effective in periodic kilns, resulting in a reduction in the incidences of cracking, this pulse firing technique poses difficulties when used in tunnel kilns. Due to the open nature of tunnel kilns it is necessary to control the ambient air ingress into the organic release zones of the kiln by other means.

Therefore, an object of the invention is to solve the above-mentioned problems of the prior art by providing an improved method for use in both tunnel and periodic kilns for firing ceramic honeycomb structural bodies which ensures stable production of high-quality crack-free product.

SUMMARY OF THE INVENTION

It is an object of the present invention to eliminate the above-mentioned problems, and to provide a process for making, and firing ceramic honeycomb structural bodies, which permits the production of ceramic honeycomb structural bodies exhibiting less cracks, nonuniform pores or non-uniform dimensions in a short time by uniformly firing the inner and outer portions of the green honeycomb structural bodies.

The method of firing a green ceramic honeycomb structural body containing an organic or carbonaceous material is characterized by an improved carbonaceous material release step. That step comprises firing the green honeycomb structural body in a firing atmosphere to a temperature and for a time sufficient to initiate and sufficiently achieve release of the carbonaceous material while introducing into the firing atmosphere a fluorine-free gas comprising less than about 20% oxygen. Once the carbonaceous material is sufficiently released, the body can be further fired conventionally for a time and a temperature sufficient to initiate and sufficiently achieve the conversion of the green ceramic honeycomb structural body into a fired honeycomb body.

Preferably, the gas comprises nitrogen introduced at a rate such that the $O_2$ present in the firing atmosphere in an amount less than about 12%, and more preferably less than about 10%.

In the above process, since the fluorine-free low-oxygen gas replaces the high $O_2$ atmosphere in the firing process resulting in a reduction of the thermal differential between the ceramic green body skin and core, fired ceramic bodies exhibiting far less thermal deformation and cracking are produced.

BRIEF DESCRIPTION OF THE FIGURES

For a better understanding of the invention, reference is made to the attached drawings, wherein:

FIG. 5 is a graphical comparison between the oxygen content during carbonaceous material release of the instant process for firing ceramic honeycomb structural bodies and that of the standard firing process.

DETAILED DESCRIPTION OF THE INVENTION

Figure 1:
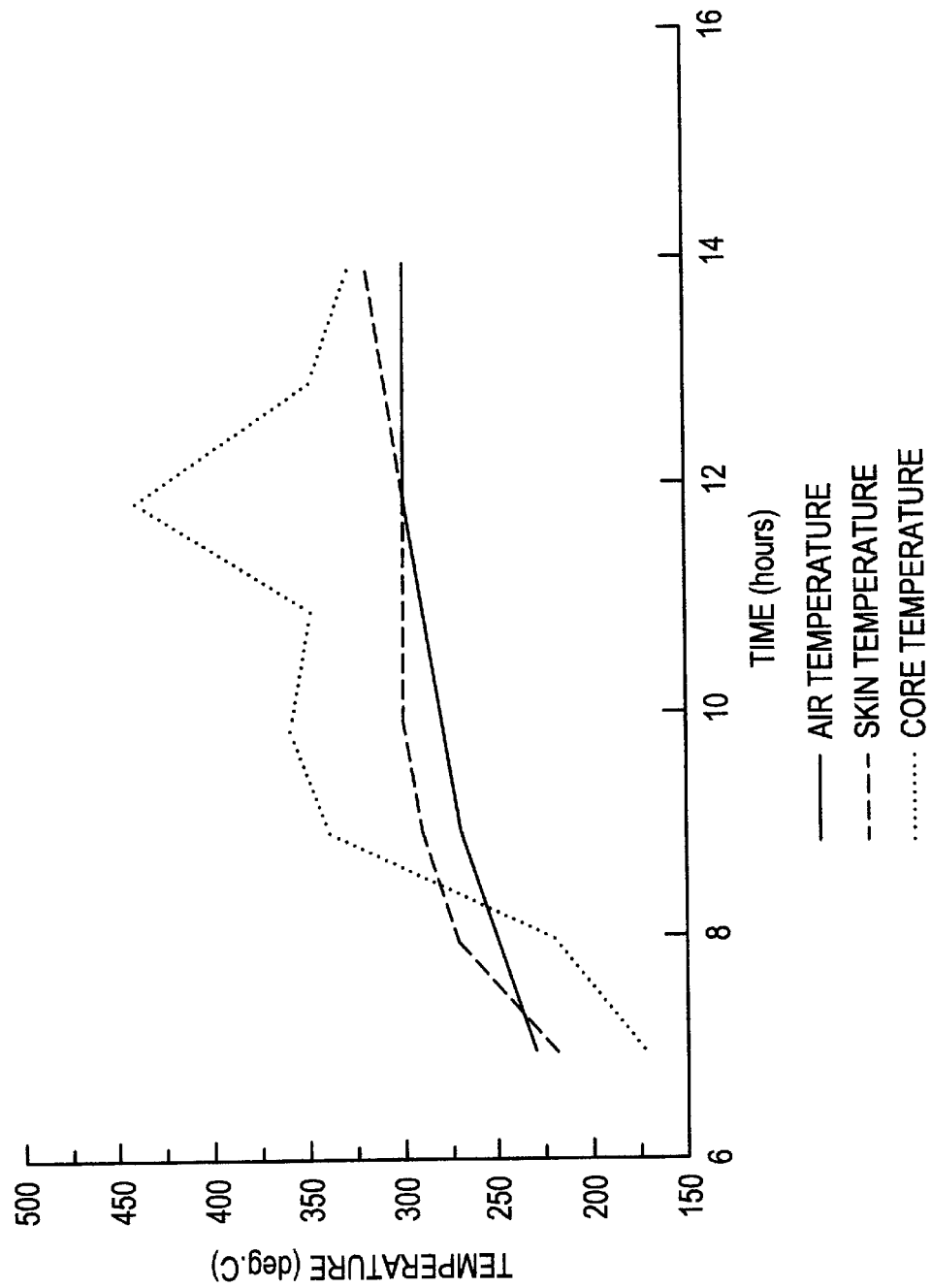
FIG. 1 is diagram representative of the differences in temperature between the core and skin of a ceramic honeycomb structural body formed and fired by conventional firing methods.

This invention provides an effective method of producing fired honeycomb ceramic structural bodies, substantially free of any detrimental effects as a result of the release of the carbonaceous material comprising firing the ceramic body, prior to sintering, to a temperature and for a time sufficient to substantially achieve the release of the carbonaceous material in a firing atmosphere which is low in oxygen due to the introduction of a fluorine-free atmosphere comprising less than about 20% $O_2$, by volume.

This invention may be applied to any ceramic material which may be detrimentally affected by carbonaceous material release and should not be subjected to high oxygen content atmospheres during said release. Typical ceramic materials include, for example, and without limitation, cordierite and alumina-containing ceramics.

The invention is hereinafter described in terms of a cordierite-containing ceramic honeycomb material, however as aforementioned, this should not be considered as limiting the invention said cordierite ceramic material.

Raw materials for ceramic batches useful in the production of cordierite ceramic honeycomb structural bodies, fabricated in accordance with the invention, may be selected from any suitable source. High-purity clay, talc, silica, alumina, aluminum hydroxides and magnesia (MgO)-yielding raw materials are conventionally used for such ceramics and are satisfactory here.

The preferred batch materials in commercial use for the production of very low expansion extruded cordierite ceramic bodies are clay, talc, and alumina, with the clays typically constituting kaolinitic clays of a platey rather than stacked habit. Platey kaolins can be produced by the pre-processing of stacked kaolinite clays, or the raw material batch including the clay can be processed in a way which breaks down the crystal stacks into platelets.

The forming of the dry batch into a preform or green body suitable for conversion to cordierite by firing can be accomplished by any one of a number of known techniques. Depending on the porosity desired in the cordierite product, the batch may be mixed with suitable organics and simply pressed into the shape of a preform, or it may be formed by a hot pressing method.

For the commercial manufacture of flat or thin-walled cordierite ceramic products such as ceramic honeycombs, the preferred forming technique is extrusion. A batch mixture suitable for extrusion can be prepared from the dry batch by mixing the batch with a suitable liquid vehicle. The vehicle may comprise water and carbonaceous extrusion aids necessary to give the batch plastic formability and sufficient green strength after forming to resist breakage prior to firing. Alternatively, the extrusion aids may be mixed with the ceramic batch materials.

The carbonaceous extrusion aids will normally comprise a liquid or solid hydrocarbon material having a vaporization, oxidation or decomposition temperature of below about 600° C., including for example, organic binders such as methylcelloluse, carboxymethicellulose, polyvinyl alcohol, alkali stearates, wheat powder, starch paste, glycerin and wax. Batches of this type, which generally contain 20–35% water, are sufficiently plastic so that they can readily be formed by extrusion into preforms comprising very thin wall dimensions; i.e., less than 1 mm. The plasticized batches can also be formed conveniently by rolling or pressing, the rolled or pressed components then being either used directly or assembled into more complex shapes prior to firing.

Furthermore, the batch mixture can include other carbonaceous materials suitable for use as pore-forming agents, including but not limited to, graphite, cherry pit flower, wood chips, saw dust and starch.

As described above, conventional firing procedures used to convert the plasticized batch or ceramic green body into a cordierite-containing ceramic product typically results in a temperature differential between the outer surface or skin and the inside or core due to the exothermic release. This organic or carbonaceous release occurs between about 100–600° C. for the aforementioned organic binders or between about 500–1000° C. for the aforementioned graphite-like materials. While the heat generated at the outer periphery or skin is more easily dissipated, though still sufficient to cause stresses which may exceed the strength of the part, the heat generated in the core of the ceramic body is more troublesome as it is not dissipated due to the cellular structure and the insulative nature of the cordierite-ceramic body. FIG. 1 illustrates a typical, undesired skin/core temperature profile, of a conventionally fired cordierite-ceramic honeycomb body; this temperature differential is such that the fired body produced tends to exhibit thermally induced deformation as well as firing cracks. As cellular bodies exhibit thinner cell walls and exhibit greater cell densities, and as more and different organic binders and graphite-like materials are used to maintain the structural integrity of these cellular bodies, this phenomenon is likely to increase.

In accordance with the method of the present invention, a desirable cordierite-ceramic crack-free product is obtained in a two phase firing process wherein the green honeycomb structural body is initially fired in a firing atmosphere to a temperature and for a time sufficient to initiate and sufficiently achieve release of the carbonaceous material while introducing into the carbonaceous material release region of the furnace a fluorine-free atmosphere comprising less than about 20% $O_2$. Carbonaceous material, e.g., binder, release typically occurs, depending on the type of organic binder, between about 100–600° C., while, on the other hand graphite is typically removed between about 500–1000° C. As such, this carbonaceous material release phase typically requires heating to a first temperature either above the first range or above the second range, depending on whether or not the ceramic body contains an amount of graphite.

While not intending to be limited by theory, the introduction of the fluorine-free low-oxygen gas into the furnace atmosphere, during carbonaceous material release, is thought to alleviate the cracking of fired cordierite ceramics due to the following phenomenon. Essentially the crack alleviation is due to a suppression in the exothermic reaction typically occurring as a result of carbonaceous material release. This exothermic reaction suppression results in a reduction in the thermal differential which in turn leads to a reduction in thermal stresses which the ceramic parts experience. Regarding the exothermic reaction suppression and subsequent reduction in the thermal differential concept, it is theorized that this effect is due to the $O_2$ in the firing atmosphere being displaced or diluted by the fluorine-free low-oxygen gas thereby reducing the amount of the $O_2$ available to react with the organic present in the body; i.e., a reduction in occurrence of the exothermic reaction $C+O_2 \rightarrow CO+$heat.

Figure 2:
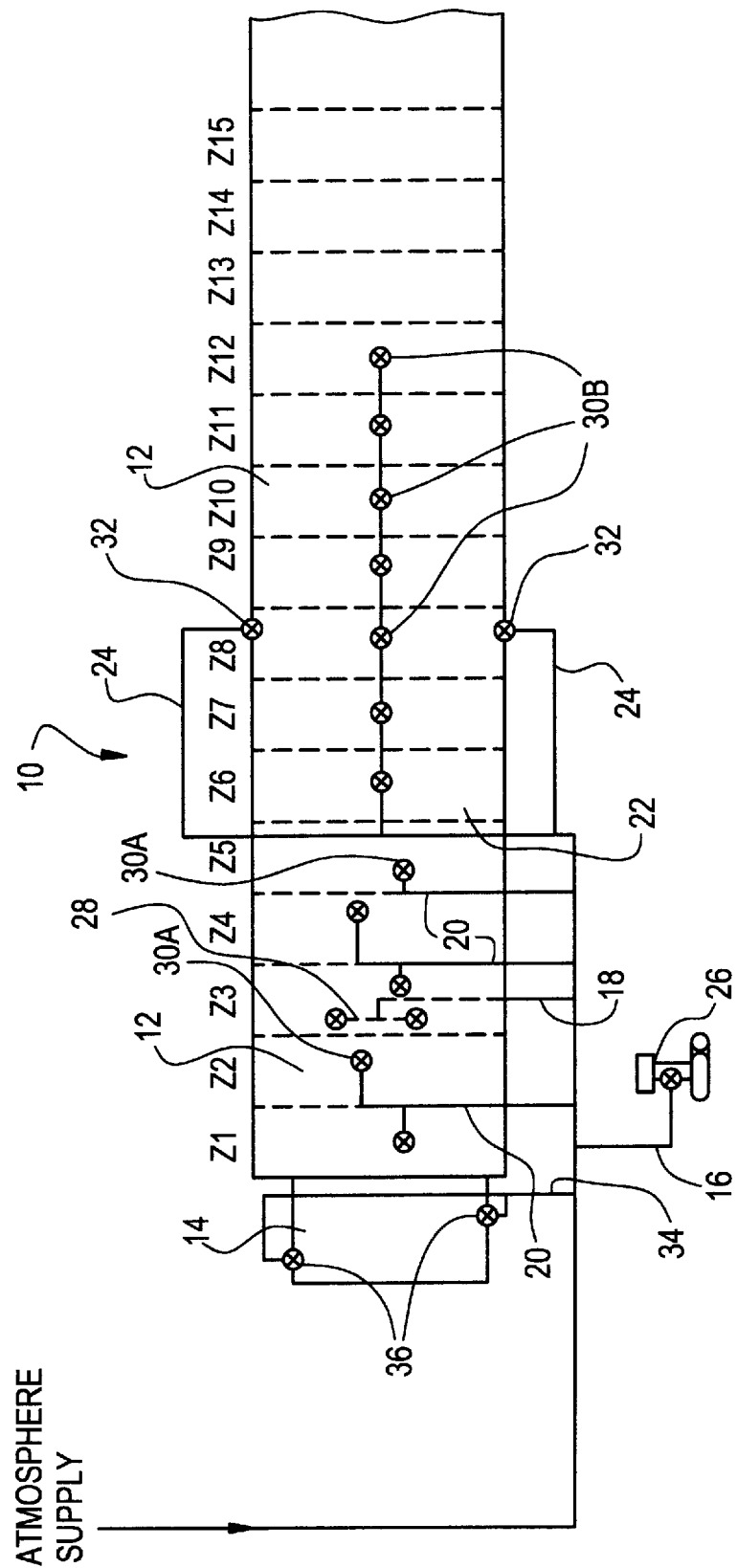
FIG. 2 is a schematic view illustrating a tunnel kiln apparatus suitably capable of being used to carry out the process for firing the ceramic honeycomb structural bodies according to the present invention.

FIG. 2 is a top view schematic illustrating an embodiment of a portion of a tunnel kiln for carrying out the firing process according to the present invention. In this embodiment, the tunnel kiln 10 comprises a carbonaceous material release region 12, i.e., the release region, with the sintering region (not shown) located downstream, and a vestibule region upstream 14, of the release region. The release region encompasses about a 100–600° C. temperature range of carbonaceous material release. The temperature range of the release region can be increased or decreased depending on the type of ceramic material to be fired by the tunnel kiln; e.g., for a ceramic material which contains graphite, in addition to an organic binder, the temperature range of the release region would be increased (up to 1000° C.).

The distribution system of the tunnel kiln comprises a series of independently metered, individually piped delivery conduits 16, 18, 20, 22, 24 each of which operatively communicates with at least one injection site which operatively communicates with the interior of the tunnel kiln's carbonaceous release region 12. It is through these conduits and associated injection sites that the low oxygen gas can be introduced into the firing atmosphere of the carbonaceous release region so as to reduce the amount of oxygen in that region. The injection sites, which communicate with the interior of the kiln, are designed to communicate with the interior of the tunnel kiln, specifically the release region, in one, or a combination of the following locations in the release region: the combustion burner 26, under the kiln cars 28, the kiln rooftop 30A, 30B, and the kiln sidewall 32. Additionally the distribution system comprises a conduit 34 and an injection port 36 located in the vestibule region 14. For a more detailed description of this tunnel kiln and the gas distribution system and introduction sites, see co-pending and co-assigned patent application, U.S. Prov. Pat. App. Ser. No. 60/067,615, hereinafter incorporated by reference.

During the carbonaceous material release the fluorine free low oxygen content gas injected into the release region through any one, or a combination, of these gas injection ports, whichever is empirically determined to be the most effective and/or efficient.

In one embodiment, introduction of the fluorine-free low-oxygen gas through the combustion burner site 26 is accomplished through introduction into the combustion air fans for those burners located in the carbonaceous release region. Introduction of the low $O_2$ gas through the inlet of the combustion air blower supplying the burners located in the release region allows for flexibility in the tailoring of the oxygen content of this combustion air supply. The low oxygen content gas is introduced into nozzle mix burners at level sufficient to sustain stable burner operation (as low as 16% $O_2$).

A second embodiment of introducing the $O_2$ at the combustion burner site 26 involves introducing the low $O_2$ content air independent of the combustion air. The combustion or primary air is used to maintain a stoichiometric fuel/air ratio, while the excess or secondary air, low $O_2$ content gas, is introduced independent of, and slightly downstream of, but proximate to, the combustion process. In other words, the low-oxygen content gas is substituted for, or mixed with, the conventional ambient air fan supply.

In either embodiment, this combustion burner low-oxygen content gas introduction enables the burners to function normally while providing two benefits: (1) production of "cooler" flame temperatures as a result of the substitution of low-oxygen content gas for the conventionally used high-oxygen content excess air; and, (2) maintenance of high 'products of combustion' burner volumes; i.e., high velocity, which contributes to production of good temperature distribution. In other words, both benefits contribute greatly to the lowering of the firing atmosphere oxygen levels without giving up the benefit of a lower burner flame temperature and without the introduction of excess oxygen into the carbonaceous material release region. Furthermore, an improvement in the firing temperature uniformity is also obtained.

Introduction of fluorine-free low oxygen gas through the undercar site 26 into the space formed between the kiln car and the bottom of the furnace raises the pressure in this space and thereby or minimizes the ingress of "ambient" air (20.9% $O_2$) into the kiln's firing atmosphere; i.e., introduction of the gas into this undercar space essentially "pressurizes" this space and thereby limits the amount of ambient oxygen drawn into this normally negative-pressure space. This is desirable due to the fact that the burners are generating products of combustion and the product is releasing carbonaceous particulate and vaporous material. The effect of introducing the gas through the undercar site improves upon that condition which is seen in conventional firing methods and tunnel kilns, in which the undercar region typically exhibits a negative pressure due, in part, the pull of the kiln's exhaust system. This negative pressure, in turn imparts a pull on the ambient or high oxygen-containing air surrounding the kiln and under car region, thereby causing significant ingress of these high oxygen ambient gases into the kiln. Specifically, this ambient (20.9% oxygen containing) air which is drawn into the kiln has a significant impact on the kiln atmosphere, usually resulting in a very high (greater than 12%) oxygen atmosphere in these conventionally designed kilns and thus a firing environment which is prone to producing cracked ware for high-organic containing starting batches.

Regarding the undercar introduction, the following principles should be noted, (1) the greater the volume of gas inputted into this undercar space the lower the amount of oxygen present; and, (2) minimization of this undercar space reduces the volume of gas necessary to "pressurize" this space.

Low oxygen-content gas introduction through either the rooftop 30A, 30B or sidewall port 32, primarily functions to dilute or replace the oxygen-rich firing atmosphere. Although there is some pressurization effect, i.e., a slight raise in pressure in the release region, this effect is minimal. Roof injection ports in the entrance portion of the release region, i.e., located just downstream of the vestibule region 14, play a dual role in that they function to not only lower the oxygen content of the firing atmosphere, by dilution, but also function to create an "air curtain" in the entrance portion of the release region. The end result is that introduction of the "low oxygen gas" in either of these rooftop ports allows for the varying of the oxygen level in each of the zones in which they operate, a flexibility which is important in the tailoring the firing atmosphere profile so that the lowest oxygen levels are maintained in the areas where the greatest amount of carbonaceous volatiles are released.

Introduction of pressurized low $O_2$ content gas into the normally negative pressure vestibule region space, according to the inventive method, essentially "pressurizes" this space, and thereby substantially limits the amount of ambient oxygen (20.9% $O_2$) drawn into this negative pressure vestibule space; a similar effect as that described above for the undercar space. A dilution effect due to the gas introduction combined with the pressurization effect of the introduction, significantly reduce the resultant oxygen present in the downstream release region. As before, for the undercar space, this portion of a conventionally designed continuous kiln is usually negative in pressure due to the pull of the kiln's exhaust system. Although this vestibule region is not completely "sealed" via the introduction of the low $O_2$-content gas, this pressurization is effective to sufficiently control the ingress leakage and when combined with the inputs from the other "low oxygen gas" introductions, results in oxygen levels in the firing atmosphere which are reduced, when compared to conventionally designed kilns.

The fluorine-free atmosphere introduced into the firing atmosphere of the organic release region is preferably one which comprises less than about 20% $O_2$, by volume, and more preferably less than about 18% $O_2$. In this embodiment the source of the fluorine-free low-oxygen gas may simply comprise recirculating the products of combustion back into the release region; i.e., drawing off the products of combustion, cooling and reintroducing them back into the carbonaceous material release region. Alternatively, an external source of products of combustion, a products of combustion generator, could be used to produce products of combustion which are thereafter introduced into the release region.

In a preferred embodiment, the source of the fluorine free atmosphere comprises products of combustion generated and reintroduced into the kiln in the following manner. It is known that kilns include in their products of combustion, or exhaust, volatilized and/or partially reacted, as well as unreacted, carbonaceous material. These products of combustion (POC), including the release volatilized and/or partially or unreacted carbonaceous material are removed from the kiln via an exhaust removal flue system that operatively communicates with the release region.

Figure 3:
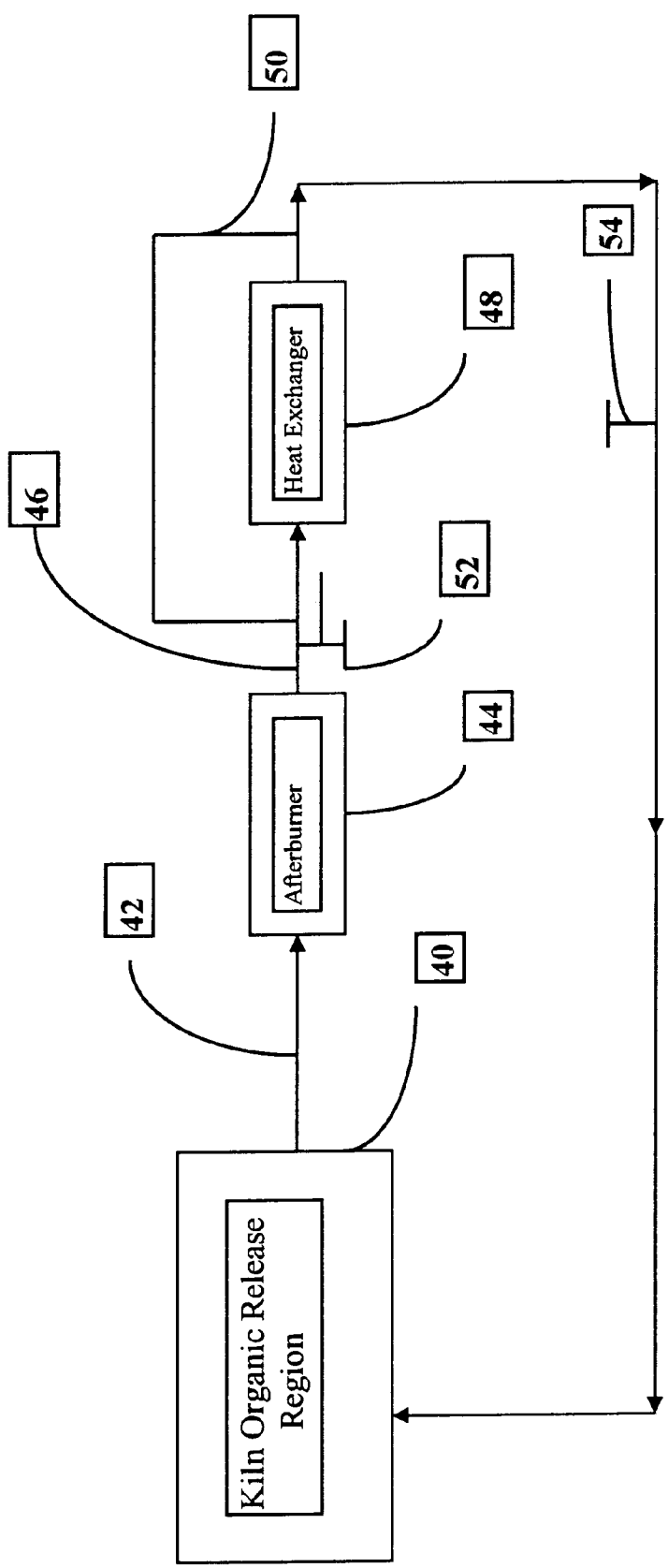
FIG. 3 is a schematic of an exhaust flue system for use in the process for firing the ceramic honeycomb structural bodies according to the present invention.

Referring now to FIG. 3, schematically illustrated is a kiln and an exhaust flue removal system and a return/delivery system capable of reintroducing the POC back into the release region of the kiln. Specifically, the POC are generated and delivered in the following manner. The POC or exhaust, including the release volatilized and/or partially or unreacted carbonaceous material are generated in the kiln's carbonaceous release region 40 and enter the flue exhaust system 42 whereupon this exhaust gas is treated by an afterburner 44 which burns any of the partially reacted and unreacted carbonaceous material remaining in the exhaust gas. This treated exhaust gas/POC is then returned back into the kiln carbonaceous release region, via a return/delivery system 46. This return/delivery system 46 includes a heat exchanger 48 which cools the POC/exhaust gas to the appropriate temperature for redelivery to the kiln release region 40. This return/delivery system 46, includes bypass line 50 and air bleeds 52, 54 each of which is used to control the temperature and amount of POC, and ultimately the $O_2$ delivered to the kiln. Other means for varying the level of oxygen in the POC introduced back into the kiln include the following: (1) increasing the afterburner combustion air (up to 50% excess $O_2$) which results in a higher $O_2$ content-POC being ultimately introduced into the kiln organic release region; and, (2) including in the afterburner combustion air an amount of $N_2$, which results in a reduced $O_2$ level being reintroduced into to the kiln release region. Lastly, it is contemplated that the POC/exhaust can be delivered to the kiln release region, via the aforementioned distribution system, and can be either the primary, or a complimentary, source of the fluorine-free low oxygen atmosphere.

Preferably, the fluorine-free low oxygen gas comprises at least about 95% nitrogen. In this embodiment, the source of the nitrogen can comprise a source of compressed ambient air which is directed through a membrane which removes the necessary amount of oxygen and other impurities so to produce a gas which exhibits the required and desired 95% nitrogen content. Another embodiment of the nitrogen source comprises a liquid compressed nitrogen gas system.

Regardless of the source of the fluorine-free low-oxygen gas utilized, it is necessary to introduce the gas at a rate whereby the resulting firing atmosphere in the release region comprises less than about 12% $O_2$, and preferably less than about 10% $O_2$, by volume, during a portion of the carbonaceous material release.

After this initial carbonaceous material release firing phase, the ceramic green body is further conventionally fired for a time and a temperature sufficient to initiate and sufficiently achieve the conversion of the green ceramic honeycomb structural body into a fired honeycomb body whose predominant crystal phase is cordierite. Temperatures in the range of 1340°–1450° C. are generally suitable for this purpose when the ceramic material comprises a cordierite containing ceramic.

The invention may be further understood by reference to the following detailed Examples, which are intended to be merely illustrative of the presently preferred method for carrying out the invention.

EXAMPLES

Three separate firing trials, one being a comparison firing trial, were conducted. In each trial, two ceramic batches, Batches 1 and 2, suitable for the production of cordierite-containing ceramic bodies were prepared. Each of the two batches comprised conventional clay-talc-alumina batch containing constituents (inorganics) and exhibited an amount of carbonaceous materials, binders, plasticizers and lubricants which generally proved to be problematic in standard tunnel kiln firing procedure; i.e., likely to result in the production of ware exhibiting an unacceptable percentage of cracking. Batch 1 comprised 90.3% inorganics and 9.7% organics, while Batch 2 comprised 91.8% inorganics and 8.9% organics, both in parts by weight. Each of the two batches for each firing trial were thoroughly blended to form a homogeneous batch.

Each batch was separately prepared from the dried batch material and water was added to the dry batch to a level of about 31% of total batch weight, and thereafter the resultant wet batch was mixed in a Littleford mixer for a sufficient amount of time to achieve batch uniformity. Each of the mixed batches were extruded to form a honeycomb substrate having a 4.16" diameter, a 4.5" length, 600 cells/sq. in and exhibiting cells walls having a 4 mil thickness.

Three separate firing trials, Firing Trials 1–3, were conducted. Firing Trials 1 and 2, involved introducing a nitrogen-rich atmosphere into the carbonaceous material release region firing atmosphere. Firing Trial 3, for comparison and involved no atmosphere introduction into the carbonaceous material release region; i.e., a standard, high oxygen, firing atmosphere. Table I reports the nitrogen-rich atmosphere introduction amounts (in cubic feet per hour; cfh) for the Firing Trials 1 and 2; the kiln having 15 designated zones for ease of discussion (see FIG. 2). The nitrogen-rich atmosphere introduced comprised a 97.0% nitrogen gas atmosphere and was generated by passing ambient air through an oxygen separator membrane. Nitrogen-rich atmosphere introduction was supplied to the kiln in the following manner; (1) vestibule region via simple vestibule-located nozzles; (2) to zones 2 and 3 via undercar-located nozzles; (3) to zone 5 via a rooftop nozzle located in a crown fan; and (4) to zones 6–12 via simple rooftop-located nozzles.

TABLE I

| Nitrogen Introduction Site | Firing Trial 1 Nitrogen Introduction (cfh) | Firing Trial 2 Nitrogen Introduction (cfh) |
| --- | --- | --- |
| Vestibule | 10,000 | 10,000 |
| Undercar - Zones 2 and 3 | 0 | 5,000 |
| Rooftop - Zone 5 | 4,000 | 4,000 |
| Rooftop - Zone 6 | 2,000 | 2,000 |
| Rooftop - Zone 7 | 2,000 | 2,000 |
| Rooftop - Zone 8 | 2,000 | 2,000 |
| Rooftop - Zone 9 | 2,000 | 2,000 |
| Rooftop - Zone 10 | 2,000 | 2,000 |
| Rooftop - Zone 11 | 2,000 | 2,000 |
| Rooftop - Zone 12 | 2,000 | 2,000 |

In each of the three firing trials 90 green honeycomb bodies of Batch 1 and 90 green bodies of Batch 2 were was placed on individual supports and placed on kiln cars along with a sufficient amount of "dummy" ware bodies to fill the kiln car. In each firing trial between 6–10 kiln cars of ware passed through the kiln at regular intervals and were subjected to the firing cycles with one car in each firing trial being monitored for ware quality, oxygen content exposure and temperature set point variation.

The rate of crack reduction, as compared to levels seen in the conventional firing (Trial 3) was checked by visual inspection of the fired bodies on each of the monitored kiln cars; TABLE II reports the percentage crack reduction in the ware for each of the two inventive firing trials when compared to that of Trial 3. It is clear from an examination of the results of TABLE II that the fired ceramic honeycomb bodies produced by Firing Trials 1 and 2, both incorporating nitrogen-rich atmosphere gas introduction in the carbonaceous material release region, exhibited a significantly lower percentage of cracked fired ceramic honeycomb bodies.

TABLE II

| | Crack Reduction | |
| --- | --- | --- |
| | Firing Trial No. 1 | Firing Trial No. 2 |
| Batch 1 | 85% | 88% |
| Batch 2 | 99% | 78% |

As described above it is thought that the crack alleviation,; i.e. the reduction in the percentage of cracked bodies, is likely due to a suppression in the exothermic reaction typically present in carbonaceous material release. For each of the Firing Trials 1–3, the kiln car containing the inspected ware was monitored for temperature variation from the temperature set point; i.e., a measure of the extent of the exotherm. TABLE III reports the temperature variation for each of the kiln cars monitored in each of the three trials as they passed through zones 3–5 (see FIG. 2 for the location of the zones), the main portion of the release region. The temperatures measured for each zone consisted of the crown temperature ($T_1$), the left wall temperature ($T_2$) and the right wall ($T_3$) temperature.

Figure 4:
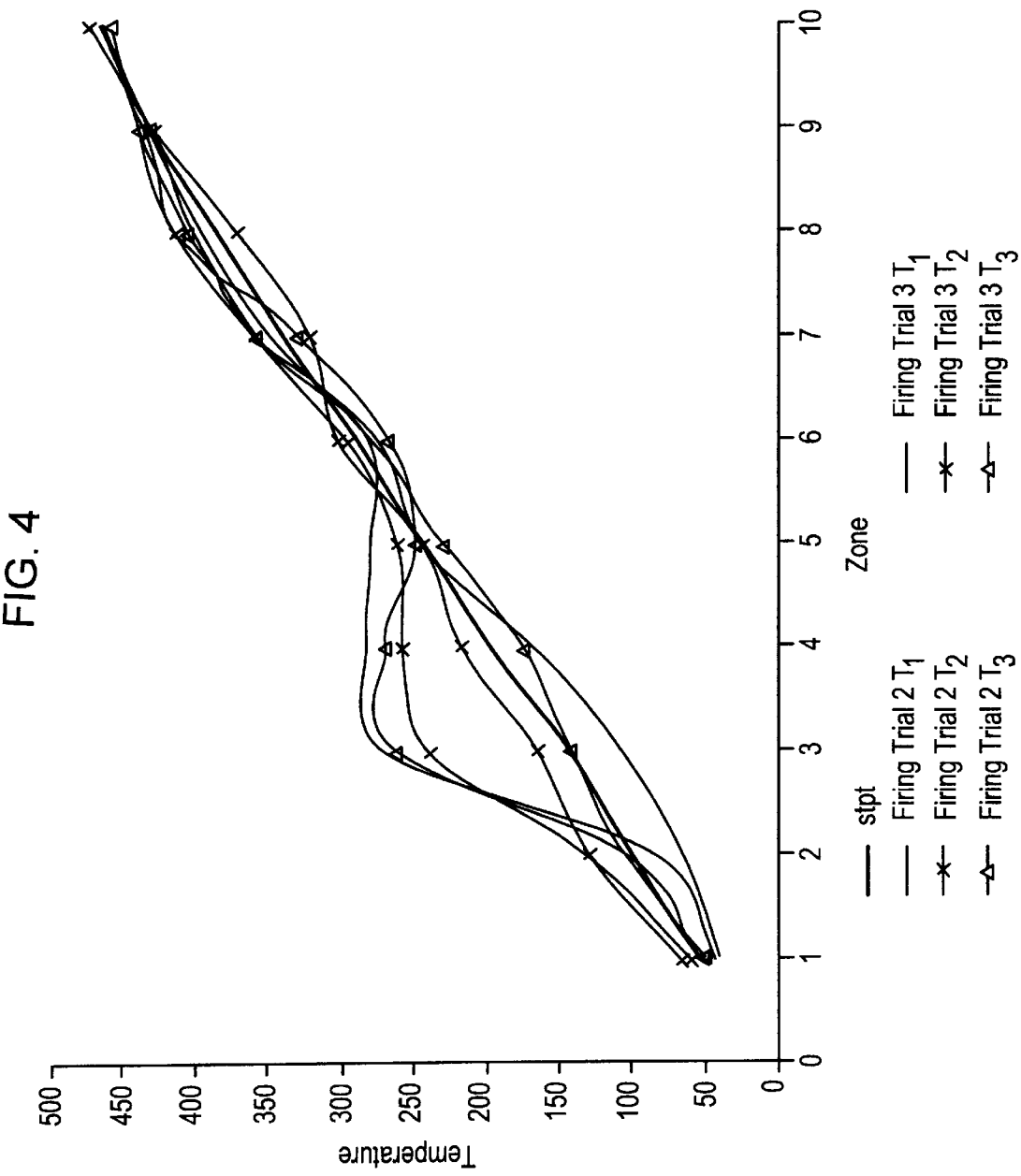
FIG. 4 is a graphical comparison between the exothermic reaction occurrence due to carbonaceous material release of the instant process for firing ceramic honeycomb structural bodies and that of the standard firing process.

An examination of TABLE III reveals this exothermic reaction suppression; the temperatures measured for zones 3–5 for Firing Trials 1 and 2 (nitrogen-rich gas introduction in the release region) remain relatively close to the set point temperatures, while the temperatures of zones 3–5 of Firing Trial 3 are much higher thereby indicating the occurrence of a substantial exothermic reaction in this comparison firing trial. FIG. 4 more clearly illustrates this effect as it compares the variation from the set point temperature of Firing Trials 2 and 3e.

TABLE III

| | Setpoint | Firing Trial No. 1 | | | Firing Trial No. 2 | | | Firing Trial No. 3 | | |
| --- | --- | --- | --- | --- | --- | --- | --- | --- | --- | --- |
| Zone No. | (° T) | $T_1$ | $T_2$ | $T_3$ | $T_1$ | $T_2$ | $T_3$ | $T_1$ | $T_2$ | $T_3$ |
| 3 | 146 | | | | 110 | 168 | 145 | 273 | 241 | 266 |
| 4 | 200 | | | | 172 | 221 | 178 | 288 | 260 | 275 |
| 5 | 249 | 243 | 253 | 246 | 249 | 249 | 235 | 285 | 265 | 255 |

As detailed above, the exothermic reaction suppression and subsequent reduction in the thermal differential concept, is theorized to be as result of the $O_2$ in the firing atmosphere being displaced or diluted by the fluorine free low-oxygen atmosphere, nitrogen in this example. TABLE IV reports the average oxygen percent present in each of the carbonaceous material release zones (1–10) during each of the three firing trials; these oxygen levels are representative of the oxygen content present when the examined ware passed through zones 1–10. An examination of TABLE IV reveals that the two firing trials incorporating the nitrogen-rich atmosphere introduction in the release region exhibited reduced oxygen content throughout release zones 1–10 when compared to that of the standard Firing Trial 3. As such, the release region firing atmospheres of Firing Trials 1 and 2 exhibited a reduced amount of $O_2$ available to react with the organics being removed. This reduced oxygen effect of the nitrogen introduction is more clearly illustrated by FIG. 5 which compares the oxygen contents of Firing Trials 1 and 2 with that of Firing Trial 3.

TABLE IV

| Zone No. | Firing Trial No. 1 $O_2$ % | Firing Trial No. 2 $O_2$ % | Firing Trial No. 3 $O_2$ % |
| --- | --- | --- | --- |
| 1 | 14.2 | 12.9 | 20.1 |
| 3 | 13.2 | 12.0 | 19.0 |
| 5 | 11.3 | 10.1 | 16.9 |
| 7 | 9.5 | 8.4 | 15.0 |
| 9 | 11.8 | 11.1 | 15.8 |
| 11 | 12.6 | 12.0 | 15.0 |
| 13 | 13.8 | 13.8 | 14.2 |
| 15 | 12.8 | 12.8 | 13.2 |

It should be noted that the fluorine-free low-oxygen gas concentration, nitrogen in the above example, which is necessary for effectively initiating the exothermic reaction suppressing effect will vary depending upon a number of factors including the composition, size and shape of the ceramic body, the ware load, and the size of the cell wall and number of cells exhibited by the ceramic body, the kiln configuration and the firing schedule utilized. As such, the concentration of the fluorine-free low-oxygen gas required in the firing atmosphere necessary to initiate the exothermic reaction suppressing effect should be empirically determined for each ceramic/kiln system.

As is clear from the above description, according to the ceramic honeycomb structural body forming and firing process of the present invention, the introduction of the fluorine-free low-oxygen atmosphere into the carbonaceous material release region reduces the oxygen content of the release region and thus suppresses the occurrence of the exothermic reaction typically associated with carbonaceous material release. As such, ceramic structural honeycomb bodies formed and fired according to the present invention will exhibit a temperature differential between the inner portion and the outer portion of the ceramic body which is far more conducive for producing fired ceramic honeycomb structural bodies which are free of thermal deformations and thermally induced cracks.

We claim:

1. A method of fabricating a ceramic honeycomb structural body comprising the steps of:

formulating a batch mixture comprised of a predetermined amount of sinterable raw materials capable of yielding a fired ceramic honeycomb;

intimately blending the raw materials with an effective amount of carbonaceous materials, to form a plastic mixture;

forming the raw materials into a green honeycomb structural body and thereafter drying the green honeycomb structural body;

firing the green honeycomb structural body in a firing atmosphere to a temperature and for a time sufficient to initiate and sufficiently achieve release of the carbonaceous material while introducing into the firing atmosphere a fluorine-free low-oxygen gas comprising less than about 20% $O_2$, by volume, the fluorine-free low-oxygen gas generated by removing products of combustion, including the released carbonaceous material, treating the products of combustion with an afterburner to burn any partially reacted or unreacted carbonaceous material in the products of combustion and reintroducing the treated products of combustion back into the firing atmosphere.

2. The method of claim 1 wherein the batch mixture comprises a mixture of kaolin clay, talc, alumina and other cordierite-forming materials, each of the raw materials included in the batch in an effective amount, which in combination with the other raw materials therein, is capable of yielding a fired honeycomb body whose predominant crystal phase is cordierite.

3. The method of claim 1 further including firing for a time and a temperature sufficient to initiate and sufficiently achieve the conversion of the green ceramic honeycomb structural body into a fired honeycomb body.

4. The method of claim 1 wherein the fluorine-free low-oxygen gas comprises less than about 18% $O_2$, by volume.

5. The method of claim 2 wherein the carbonaceous material comprises a liquid or solid hydrocarbon material having a vaporization, decomposition or evaporation temperature of below about 600° C.

6. The method of claim 5 wherein the carbonaceous material comprises a polymer binder.

7. The method of claim 5 wherein the carbonaceous material comprises a hydrocarbon oil or wax binder.

8. The method of claim 1 wherein the carbonaceous material comprises graphite.

9. The method of claim 1 wherein the fluorine-free low-oxygen gas introduced comprises at least about 95% nitrogen.

10. The method of claim 1 wherein the fluorine-free low-oxygen gas introduced comprises at least about 97.5% nitrogen.

11. The method of claim 1 wherein the fluorine-free low-oxygen gas is introduced at a rate whereby the resulting firing atmosphere comprises less than about 12% $O_2$ during a portion of the carbonaceous material release.

12. The method of claim 1 wherein the fluorine-free low-oxygen gas is introduced at a rate whereby the resulting firing atmosphere comprises less than about 10% $O_2$ during a portion of the carbonaceous material release.

13. A method of firing a green ceramic honeycomb structural body containing a predetermined amount of sinterable raw materials, including an amount of a carbonaceous material, capable of yielding a fired honeycomb body, comprising the steps of:

firing the green honeycomb structural body in a firing atmosphere to a temperature and for a time sufficient to initiate and sufficiently achieve release of the carbonaceous material while introducing into the firing atmosphere a fluorine-free low-oxygen gas comprising less than about 20% $O_2$, by volume, the fluorine-free low-oxygen gas generated by removing products of combustion, including the released carbonaceous material, treating the products of combustion with an afterburner to burn any partially reacted or unreacted carbonaceous material in the products of combustion and reintroducing the treated products of combustion back into the firing atmosphere.

14. The method of claim 13 wherein the fluorine-free low-oxygen gas comprises less than about 18% $O_2$, by volume.

15. The method of claim 13 wherein the sinterable raw materials comprise a mixture of kaolin clay, talc, alumina and other cordierite-forming materials, each of the raw materials included in an effective amount, which in combination with the other raw materials therein, is capable of yielding a fired honeycomb body whose predominant crystal phase is cordierite.

16. The method of claim 13 involving further heating for a time and a temperature sufficient to initiate and sufficiently achieve the conversion of the green ceramic honeycomb structural body into a fired honeycomb body.

17. The method of claim 13 wherein the carbonaceous material comprises a liquid or solid hydrocarbon material having a vaporization, decomposition or evaporation temperature of below about 600° C.

18. The method of claim 17 wherein the carbonaceous material comprises a polymer binder.

19. The method of claim 17 wherein the carbonaceous material is comprises a hydrocarbon oil or wax binder.

20. The method of claim 13 wherein the carbonaceous material comprises graphite.

21. The method of claim 13 wherein the fluorine-free low-oxygen gas comprises at least about 95% nitrogen.

22. The method of claim 13 wherein the fluorine-free low-oxygen gas comprises at least about 97.5% nitrogen.

23. The method of claim 13 wherein the fluorine-free low-oxygen gas is introduced at a rate whereby the resulting firing atmosphere comprises less than 12% $O_2$ during at least a portion of the carbonaceous material release.

24. The method of claim 13 wherein the fluorine-free low-oxygen gas is introduced at a rate whereby the resulting firing atmosphere comprises less than about 10% $O_2$ during at least a portion of the carbonaceous material release.

* * * * *